Patented Feb. 20, 1940

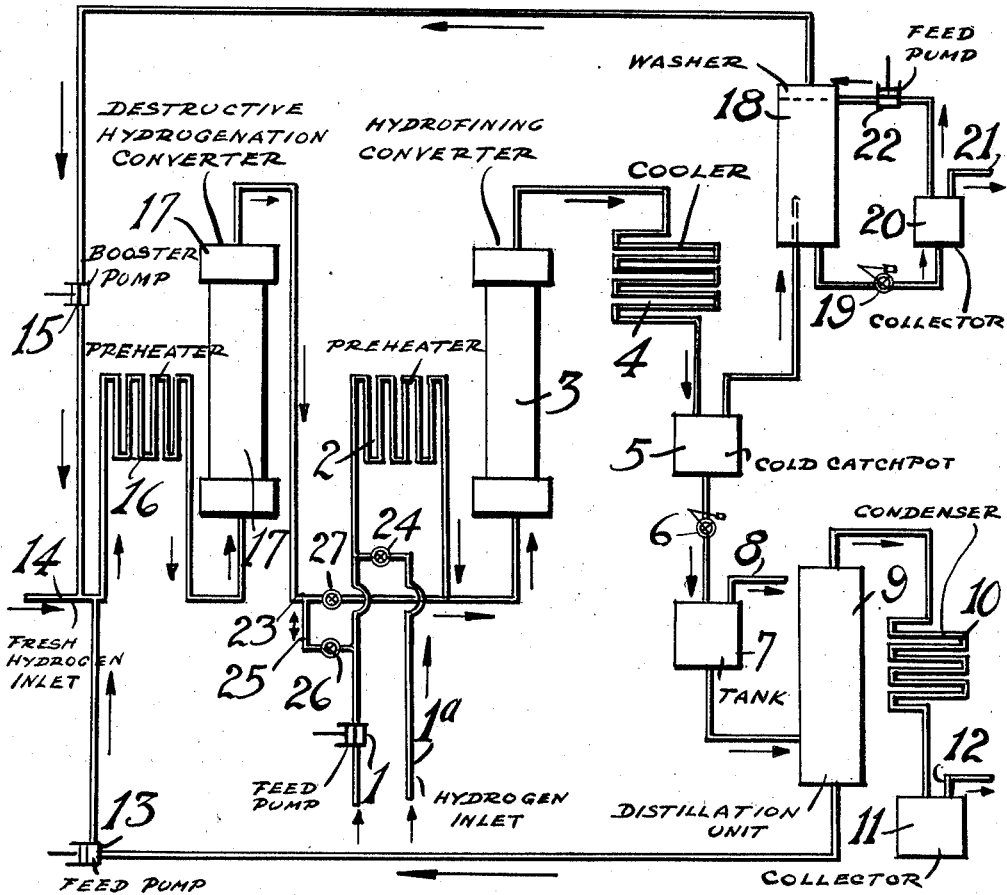

2,191,157

UNITED STATES PATENT OFFICE 2,191,157

PRODUCTION OF LOWER BOILING HYDROCARBONS FROM HEAVY HYDROCARBONS

Mathias Pier, Heidelberg, and Walter Simon and Walter Berger, Ludwigshafen-on-the-Rhine, Germany, assignors to Standard-I. G. Company, Linden, N. J., a corporation of Delaware Application October 23, 1937, Serial No. 170,532
In Germany October 23, 1936

12 Claims. (Cl. 196—53)

The present invention relates to the manufacture and production of hydrocarbons of lower boiling point, from heavy or mediumly heavy hydrocarbon materials by catalytic treatment with hydrogenating gases.

In the production of hydrocarbons by catalytic destructive hydrogenation with a hydrogenating gas, such as hydrogen or gases comprising free hydrogen, of heavy or mediumly heavy liquid or fusible hydrocarbon material, for example, mineral oils, products or residues obtained by distilling or cracking mineral oils or fractions thereof, or liquid or fusible conversion products of solid carbonaceous materials, for example, various sorts of coal, including bituminous coal and lignite, or of peat, shale and the like, the effect and activity of the catalysts, especially those catalysts of the highly active type which are supported by pretreated carriers, is usually not satisfactory when the said initial materials are poor in hydrogen and/or contain oxygen or nitrogen.

It has been proposed to overcome these drawbacks by subjecting the initial material poor in hydrogen and/or containing oxygen or nitrogen to a refining catalytic hydrogenation, known as hydrofining, and to subject the hydrofined material to splitting destructive hydrogenation. This procedure is, however, not successful in all cases.

If, for example, the splitting destructive hydrogenation is carried out in a unit comprising preheating, heat exchanging and cooling means, means for recycling the hydrogenating gas and two converters, the converter for splitting destructive hydrogenation being placed directly behind the converter in which the hydrofining treatment takes place, and if the totality of the hydrofined products is passed to the splitting destructive hydrogenating converter without separation of the hydrogenating gas and without intermediate condensation, the catalyst in the second converter usually does not exert its full splitting activity and effect, which is apparently due to impurities contained in the mixture issuing from the first converter, and in this case the conversion and yield are unsatisfactory. In order to obtain satisfactory results, it is necessary to have a separate unit for each stage, that is to say after the hydrofining stage the hydrogenating gas must be separated off, the pressure on the products which issue from the hydrofining converter must be released, the products must be condensed by cooling, the liquid products must be separated from non-condensable material, and the hydrofined material then passed to the splitting destructive hydrogenation converter together with fresh hydrogen; a similar separation of hydrogenating gas, release of pressure and separation of liquid and gaseous materials must also be carried out after the splitting destructive hydrogenation stage, in order to recover the final light hydrocarbons, whereas the hydrogenating gases from both stages are separately recycled. It is accordingly necessary to have two complete units comprising means for preheating, for heat-exchanging, for cooling and for recycling the hydrogenating gas and to arrange for each unit individual devices for release of pressure and for separation of gaseous and liquid materials. The entire procedure and apparatus are cumbersome, complicated and wasteful as regards energy and heat balance, and capital costs.

We have now found that liquid or fusible, heavy or mediumly heavy hydrocarbon materials are converted into hydrocarbons of lower boiling point with excellent yields and throughputs while avoiding the aforesaid disadvantages, by subjecting the said initial materials in a first stage to hydrofining, separating the lower boiling constituents and the hydrogenating gas from the resulting products, subjecting the higher boiling constituents in a second stage to a splitting destructive hydrogenation and recycling substantially the entire reaction mixture including hydrogenating gas obtained in the second stage to the first stage.

Liquid or fusible, heavy or mediumly heavy hydrocarbon materials suitable as initial materials in the present process are, for example, mineral oils and fractions thereof, tars such as primary tar, low temperature tar, liquid products obtained from solid carbonaceous materials such as various sorts of coal, including bituminous coal and brown coal, peat, shale and wood by distillation, destructive hydrogenation or extraction under pressure, or fractions of the said initial materials, more particularly those which are poor in hydrogen and/or contain oxygen or nitrogen.

The process in accordance with the present invention is more particularly suitable for the treatment of middle oils of any origin, which may have a boiling range of, for example, between 180° and 325° C., up to 350° C. or more. Gasoline may also be present in the initial materials.

The chief advantage of the process according to the present invention is that it is carried out in one unit, which allows, inter alia, of having only one separation of hydrogenating gas and gasoline and if desired middle oil from heavier products carried out, in contrast to previous processes in which two units are necessary and where such separation takes place more than once. As a consequence thereof, the heat and energy balance of the present process is considerably improved as compared with known processes.

The process may also be carried out in more than two stages, by subdividing the first and/or the second stage, or the initial materials may be pretreated, or the products further treated.

The hydrofining stage is carried out with the aid of hydrogenating catalysts stationarily contained in the converter, or with hydrogenating catalysts dispersed in the initial material. In the splitting destructive hydrogenation stage a stationary hydrogenating catalyst is usually employed, but it is possible to work with finely divided hydrogenating catalysts dispersed in the reagents also in this stage.

Catalysts having a strong hydrogenating action are preferably employed in the first stage, more particularly sulphides and/or oxides of heavy metals, for example, sulphides of tungsten or molybdenum, if desired in admixture with sulphides or oxides of other metals, for example of cobalt, manganese, zinc or magnesium. The catalysts may be supported by carriers such as active carbon, silica gel, bleaching earth and the like, which may have undergone a preliminary treatment, for example, an activation by means of steam or acids.

The hydrofining stage is usually carried out under strong hydrogenating conditions.

The second stage is advantageously carried out in the presence of catalysts having a strong splitting action, which may with advantage be supported by carriers which have undergone a suitable preliminary treatment. Especially good results are obtained with catalysts, which are supported by carriers which have been treated with fluorine or hydrogen fluoride.

The splitting destructive hydrogenation stage is carried out under strong splitting conditions.

The working temperature and/or pressures are usually different in the two stages, according to the nature of the initial materials and to the effect obtained in the first stage, for instance the degree of refining; but the same temperatures and/or pressures may sometimes also be made use of in both stages. Usually the hydrofining stage is carried out at lower temperatures than the destructive hydrogenation stage. If, however, the hydrofining treatment has been sufficiently effective, the splitting destructive hydrogenation may be carried out at lower temperatures than those used in the first stage with suitable adjustment of the throughputs.

The total working pressures are of the order of, for example, 50, 100, and preferably 200, 300, 500, 700, 1000 atmospheres or more.

Streaming hydrogenating gases, such as hydrogen or gases comprising free hydrogen, are employed in both stages.

The following examples will further illustrate how the present invention is carried out in practice, but the invention is not limited to the said examples. The parts and percentages are by weight unless otherwise stated.

*Example 1*

The accompanying drawing diagrammatically illustrates an apparatus suitable for carrying out the process in accordance with the present invention.

In the drawing 1 is a feed pump for initial material, 1a a feed pipe for hydrogen, 2 a preheater, 3 a hydrofining converter, 4 a cooler, 5 a cold catchpot, 6 a pressure release valve, 7 a tank, 8 an outlet pipe, 9 a distillation unit, 10 a condenser, 11 a collector, 12 an outlet pipe, 13 a feed pump for middle oil, 14 a pipe for introducing fresh hydrogen, 15 a booster pump, 16 a preheater, 17 a destructive hydrogenation converter, 18 a washer, 19 a pressure release valve, 20 a collector, 21 an outlet pipe, 22 a feed pump, 23 a pipe connecting converter 17 to preheater 2, 24 a valve shutting off hydrogen feed pipe 1a, 25 a by-pass pipe for passing the oil fed by pump 1 direct to pipe 23, and 26 a valve for shutting off by-pass pipe 25, 27 being a valve for closing pipe 23.

A mixture of 40 parts of middle oil containing phenols, obtained by distillation of brown coal tar, 20 parts of gasoline obtained by low temperature carbonization of brown coal and 40 parts of a product obtained by subjecting to destructive hydrogenation in the liquid phase a distillation residue of brown coal tar, is fed with the aid of pump 1 together with hydrogen from pipe 1a into preheater 2 and subjected to hydrofining in converter 3 at 400° C. under a pressure of 250 atmospheres, valve 26 being closed. A catalyst made of 10 parts of tungsten sulphide supported by 90 parts of bleaching earth known under the trade name "Terrana" which has been treated by means of hydrofluoric acid is stationarily contained in converter 3. The reaction mixture passes through cooler 4 into cold catchpot 5. The gases and non-condensed vapors pass into washer 18, and the liquid products through pressure release valve 6 into collector 7. The liquid product is then separated into gasoline and middle oil in distillation unit 9, the gasoline vapors being cooled in condenser 10 and collected in tank 11, from which non-condensed products and gases escape through pipe 12. The middle oil, which is withdrawn from the distillation unit, is fed by pump 13 to preheater 16 together with fresh hydrogen from pipe 14 and recycle hydrogen from booster pump 15. The mixture of middle oil and hydrogen from preheater 16 is subjected to splitting destructive hydrogenation in converter 17 at a temperature of 385° C. under a pressure of 250 atmospheres, the same catalyst being stationarily contained in converter 17 as in converter 3. The reaction mixture passes from converter 17 through pipe 23 into converter 3, where it is subjected to hydrofining hydrogenation together with fresh initial materials issuing from preheater 2. The hydrogenating gas which escapes from cold catchpot 5 is washed in washer 18 into the upper region of which washing oil is pressed with the aid of pump 22. The pressure prevailing on the oil withdrawn at the bottom of washer 18 is released by means of valve 19 and the oil is collected in vessel 20, from where gases dissolved in the oil escape through line 21, and the oil is recirculated to the washer by means of pump 22. The washed hydrogenating gas, which is still under pressure, is recirculated to preheater 16 by means of booster pump 15.

The gasoline obtained contains 40 per cent of constituents having a boiling point below 100° C. and has an octane number of 66.

Instead of passing the fresh feed oil together with fresh hydrogen through preheater 2, it is also possible to mix the fresh feed oil to the products passing through pipe 23 by means of by-pass pipe 25 and to pass the mixture through preheater 2 into converter 3, while closing valves 24 and 27. It is also possible to direct part of the products from converter 17 to converter 3 through line 23, valve 27 being open only in part, whereas the rest of the products from converter 17 passes through line 25 and partially open valve 26 to preheater 2 together with fresh oil supplied by pump 1.

The throughput is 0.7 kilogram of middle oil per litre of catalyst space per hour in the hydrofining stage and 1 kilogram in the splitting destructive hydrogenation stage.

*Example 2*

A tar obtained by low temperature carbonization of brown coal and containing 52 per cent of constituents boiling up to 350° C. is fed together with hydrogen into preheater 2 under a pressure of 250 atmospheres, heated therein to 350° C. and then passed into the hydrofining converter 3 charged with tungsten sulphide in pieces as a catalyst. The product which is separated in the receiver 7 is free of phenol and asphalts and contains 12 per cent of gasoline and 47 per cent of a middle oil with a boiling point range up to 350° C. The constituents boiling up to 350° C. are separated in column 9, while the rest of the oil is heated together with hydrogen to 390° C. in a preheater 16 under a pressure of 250 atmospheres and then passed through converter 17 in which a catalyst composed of 10 parts of tungsten sulphide and 90 parts of bleaching earth known under the trade name "Terrana" which has been treated with hydrofluoric acid is stationarily arranged. The product thus formed contains 24 per cent of gasoline and 43 per cent of middle oil. All of the product is then passed together with the gases and with fresh feed oil through converter 3. From column 9 a non-knocking gasoline and a good Diesel oil can be drawn off continuously.

What we claim is:

1. A process for the production of lower boiling hydrocarbons from crude liquid or fusible heavy or medium heavy hydrocarbon materials, which comprises subjecting the said materials in a first stage to catalytic hydrofining, separating the lower boiling constituents and hydrogenating gas from the resulting products, subjecting the higher boiling constituents of the previously hydrofined product in a second stage to a splitting destructive hydrogenation and recycling substantially the entire reaction mixture obtained in the second stage to the first stage.

2. A process as claimed in claim 1, in which the catalyst employed in the first stage has a strong hydrogenating action.

3. A process as claimed in claim 1, in which a sulphide of a heavy metal is employed as catalyst in the first stage.

4. A process as claimed in claim 1, in which the first stage is carried out in the presence of a hydrogenating catalyst stationarily contained in the converter.

5. A process as claimed in claim 1, in which the catalyst employed in the first stage is supported by a carrier.

6. A process as claimed in claim 1, in which a catalyst of a splitting action is employed in the second stage.

7. A process as claimed in claim 1, in which the second stage is carried out in the presence of a hydrogenating catalyst stationarily contained in the converter.

8. A process as claimed in claim 1, in which the catalyst employed in the second stage is supported by a carrier which has been subjected to an activating pretreatment.

9. A process as claimed in claim 1, in which the same catalyst is employed in both stages.

10. A process as claimed in claim 1, in which the second stage is carried out at a temperature higher than that employed in the first stage.

11. A process as claimed in claim 1, in which both stages are carried out at a total pressure between 50 and 1000 atmospheres.

12. A process as claimed in claim 1, in which a middle oil, having a boiling range between about 180° and about 350° C., is the initial material.

MATHIAS PIER.
WALTER SIMON.
WALTER BERGER.